United States Patent
Gotou et al.

(10) Patent No.: US 9,873,809 B2
(45) Date of Patent: Jan. 23, 2018

(54) INK, IMAGE FORMING METHOD, IMAGE FORMING APPARATUS, AND RECORDED MATTER

(71) Applicants: Hiroshi Gotou, Shizuoka (JP); Keita Katoh, Kanagawa (JP); Yuuki Yokohama, Kanagawa (JP); Yukiko Takamura, Wakayama (JP); Hiromi Sakaguchi, Kanagawa (JP)

(72) Inventors: Hiroshi Gotou, Shizuoka (JP); Keita Katoh, Kanagawa (JP); Yuuki Yokohama, Kanagawa (JP); Yukiko Takamura, Wakayama (JP); Hiromi Sakaguchi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/194,832

(22) Filed: Jun. 28, 2016

(65) Prior Publication Data

US 2017/0009092 A1    Jan. 12, 2017

(30) Foreign Application Priority Data

Jul. 7, 2015   (JP) .................... 2015-136051
Jan. 27, 2016  (JP) .................... 2016-013237

(51) Int. Cl.
*C09D 11/033* (2014.01)
*C09D 11/322* (2014.01)
*C09D 11/36* (2014.01)
*C09D 11/38* (2014.01)

(52) U.S. Cl.
CPC .......... *C09D 11/322* (2013.01); *C09D 11/033* (2013.01); *C09D 11/36* (2013.01); *C09D 11/38* (2013.01)

(58) Field of Classification Search
CPC ..... C09D 11/033; C09D 11/322; C09D 11/36; C09D 11/38
USPC ................ 106/31.86, 31.89, 31.9; 347/1; 428/195.1
See application file for complete search history.

(56) References Cited

U.S. PATENT DOCUMENTS

| 8,476,332 B2* | 7/2013 | Jeremic .............. C09D 11/101 427/256 |
| 2011/0318543 A1 | 12/2011 | Goto |
| 2012/0128949 A1 | 5/2012 | Goto |
| 2012/0320137 A1 | 12/2012 | Fujii et al. |
| 2013/0101814 A1 | 4/2013 | Gotou et al. |
| 2013/0143008 A1 | 6/2013 | Gotou et al. |
| 2013/0169724 A1 | 7/2013 | Gotou |

(Continued)

FOREIGN PATENT DOCUMENTS

| JP | 8-170041 | 7/1996 |
| JP | 2003-159860 | 6/2003 |

(Continued)

*Primary Examiner* — Bruce H Hess
(74) *Attorney, Agent, or Firm* — Oblon, McClelland, Maier & Neustadt, L.L.P.

(57) ABSTRACT

Ink includes a coloring material, an organic solvent, and water, wherein the ink satisfies the following requisites:
  I. the organic solvent includes an organic solvent X having a solubility parameter (SP value) of 8.9-12.0,
  II. the organic solvent includes glycol ether compound (compound Z) having a vapor pressure of 50 mmHg or greater at 100 degrees C., and
  III. a mass ratio of the organic solvent X to the glycol ether compound is 1:1-8:1.

11 Claims, 1 Drawing Sheet

(56) References Cited

U.S. PATENT DOCUMENTS

| | | |
|---|---|---|
| 2014/0072779 A1 | 3/2014 | Matsuyama et al. |
| 2014/0120331 A1 | 5/2014 | Koizuka et al. |
| 2014/0141209 A1 | 5/2014 | Koizuka et al. |
| 2014/0198160 A1 | 7/2014 | Harada et al. |
| 2014/0199530 A1 | 7/2014 | Katoh et al. |
| 2014/0242352 A1 | 8/2014 | Naruse et al. |
| 2015/0056425 A1 | 2/2015 | Nagai et al. |
| 2015/0064418 A1 | 3/2015 | Matsuyama et al. |
| 2015/0064425 A1 | 3/2015 | Matsuyama et al. |
| 2015/0079358 A1 | 3/2015 | Gotou et al. |
| 2015/0103116 A1 | 4/2015 | Gotou |
| 2015/0109382 A1 | 4/2015 | Naruse et al. |
| 2015/0116421 A1 | 4/2015 | Nonogaki et al. |
| 2015/0125672 A1 | 5/2015 | Katoh et al. |
| 2015/0247049 A1 | 9/2015 | Matsuyama et al. |
| 2015/0252203 A1 | 9/2015 | Matsuyama et al. |
| 2015/0259555 A1 | 9/2015 | Katoh et al. |
| 2015/0283828 A1 | 10/2015 | Aoai et al. |
| 2015/0291817 A1 | 10/2015 | Katoh et al. |
| 2015/0307734 A1 | 10/2015 | Nonogaki et al. |
| 2015/0376425 A1 | 12/2015 | Hakiri et al. |
| 2016/0017075 A1 | 1/2016 | Harada et al. |
| 2016/0032037 A1 | 2/2016 | Harada et al. |
| 2016/0075892 A1 | 3/2016 | Harada et al. |
| 2016/0102162 A1 | 4/2016 | Harada et al. |

FOREIGN PATENT DOCUMENTS

| | | |
|---|---|---|
| JP | 2004-204070 | 7/2004 |
| JP | 2005-171094 | 6/2005 |
| JP | 2008-208232 | 9/2008 |
| JP | 2009-263557 | 11/2009 |
| JP | 2012-111845 | 6/2012 |
| JP | 2012-241135 | 12/2012 |
| JP | 2013-035993 | 2/2013 |
| JP | 2013-100395 | 5/2013 |
| JP | 2013-107952 | 6/2013 |
| JP | 2014-043493 | 3/2014 |
| WO | WO2008/102722 A1 | 8/2008 |

\* cited by examiner

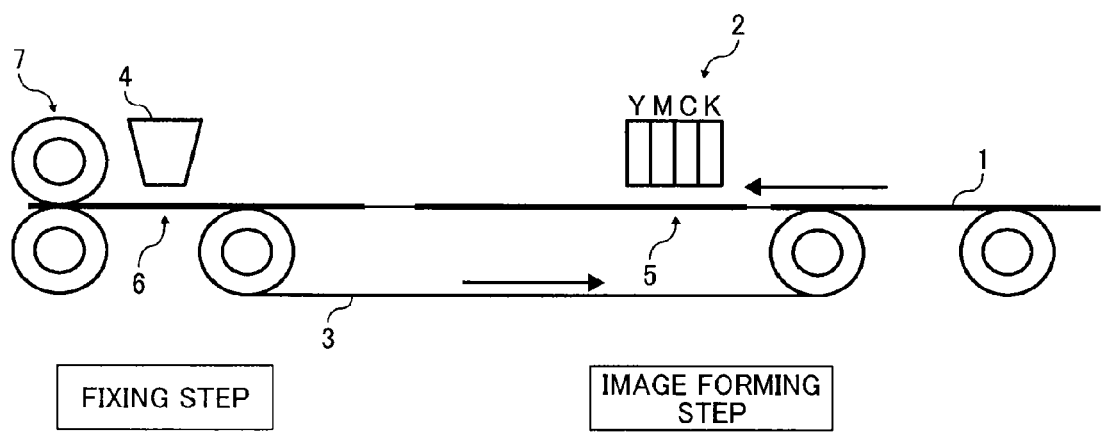

INK, IMAGE FORMING METHOD, IMAGE FORMING APPARATUS, AND RECORDED MATTER

CROSS-REFERENCE TO RELATED APPLICATIONS

This patent application is based on and claims priority pursuant to 35 U.S.C. §119 to Japanese Patent Application Nos. 2015-136051 and 2016-013237, filed on Jul. 7, 2015 and Jan. 27, 2016, respectively, in the Japan Patent Office, the entire disclosures of which are hereby incorporated by reference herein.

BACKGROUND

Technical Field

The present invention relates to ink, an image forming method, an image forming apparatus, and recorded matter.

Description of the Related Art

Color images can be formed with ease utilizing inkjet recording methods. Therefore, the inkjet recording method is widely and rapidly used reflecting low running costs. However, depending on a combination of ink and recording media, this method causes image deficiencies such as ink blurring, which significantly degrades image quality.

For example, if images are recorded on coated paper for commercial printing or publication printing using fillers such as calcium carbonate and kaolin as a coated layer material, images are blurred significantly or ink density does not demonstrate.

This is because, since, unlike inkjet special paper, coated paper is not designed to absorb a great quantity of ink in a short time, the ink that has not been absorbed in time causes blurring or even if the ink is absorbed in the coated layer, the coloring material in the ink is sealed by a filler having a high shielding property such as kaolin. Therefore, this kind of paper is thought unfit for inkjet recording.

In addition, with regard to ink for inkjet, aqueous pigment ink in which pigment particulates are dispersed in water is now appealing. Pigments have compositions similar to those of coloring materials for use in typical commercial printing ink so that texture of printed matter of the pigment is expected to be close to that of commercial printing. However, if images are printed (recorded) on coated paper for commercial printing or publication printing using pigment ink, the ink is not absorbed in time, causing beading or since drying property is poor, the ink is easily transferred to a transfer roller.

SUMMARY

According to the present invention, provided is an improved ink including a coloring material, an organic solvent, and water, wherein the ink satisfies the following requisites:

I. The organic solvent includes an organic solvent X having a solubility parameter (SP value) of 8.9-12.0.

II. The organic solvent includes glycol ether compound (compound Z) having a vapor pressure of 50 mmHg or greater at 100 degrees C.

III. The mass ratio of the organic solvent X to the glycol ether compound is 1:1-8:1.

BRIEF DESCRIPTION OF THE VIEW OF THE DRAWING

Various other objects, features and attendant advantages of the present invention will be more fully appreciated as the same becomes better understood from the detailed description when considered in connection with the accompanying drawings in which like reference characters designate like corresponding parts throughout and wherein:

The drawing is a diagram illustrating an example of the image forming apparatus according to an embodiment of the present invention.

DESCRIPTION OF THE EMBODIMENTS

Embodiment 1 of the present invention is:

An ink includes a coloring material, an organic solvent and water, wherein the ink satisfies the following requisites.

I. The organic solvent includes an organic solvent X having a solubility parameter (SP value) of 8.9-12.0.

II. The organic solvent includes glycol ether compound (compound Z) having a vapor pressure of 50 mmHg or greater at 100 degrees C.

III. The mass ratio of the organic solvent X to the glycol ether compound is 1:1-8:1.

The following embodiments 2 to 10 are also included in the present invention. These are also described in detail.

2. In the ink of 1 mentioned above, the glycolether compound (compound Z) includes at least one of propyleneglycol monopropylether, propyleneglycol monomethylether, propyleneglycol monoethylether, propylene glycol monobutylether, 3-methoxy-1-butanol, and 3-methoxy-3-methyl-1,butanol.

3. In the ink of 1 or 2 mentioned above, the organic solvent X accounts for 20 percent by mass of the total mass of the ink.

4. In the ink of any one of 1 to 3 mentioned above, the organic solvent X is represented by the following chemical formula 1 or chemical formula 2.

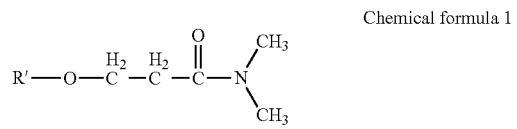

Chemical formula 1

In the Chemical formula 1, R' represents an alkyl group having 4-6 carbon atoms.

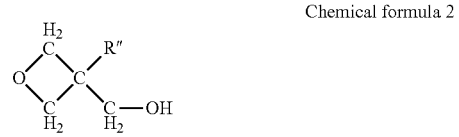

Chemical formula 2

In the Chemical formula 2, R" represents an alkyl group having one or two carbon atoms.

5. The ink of any one of 1 to 4 mentioned above further includes a polyether-modified siloxane compound as a surfactant.

6. The ink of any one of 1 to 5 mentioned above has a static surface tension of 20 mN/m or greater and a dynamic surface tension of 34 mN/m or less at a bubble life time of 15 msec as measured by maximum bubble pressure technique.

7. In the ink of any one of 1 to 6 mentioned above, the coloring material includes a pigment.

8. An image forming method includes applying at least one kind of stimulus selected from the group consisting of heat, pressure, vibration, and light to the ink of any one of 1 to 7 mentioned above to jet the ink and forming an image on a recording medium.

9. An image forming apparatus includes an ink discharging device to apply at least one kind of stimulus selected from the group consisting of heat, pressure, vibration, and light to the ink of claim 1 to jet the ink to a recording medium to form an image thereon.

10. Recorded matter includes a recording medium and an image formed on the recording medium using the ink of any one of 1 to 7 mentioned above.

Ink

Organic Solvent

The ink of the present invention includes at least one kind of the organic solvent X having a solubility parameter (SP value) of 8.9-12.0. Inclusion of the organic solvent X improves wettability of the ink to a recording medium so that the ink components permeates into commercial printing paper such as coated paper having a coated layer with poor ink absorption property. Therefore, occurrence of beading is suppressed.

As the organic solvent X, water-soluble articles are suitable. In particular, the amide compound represented by the Chemical formula 1 or the oxetane compound represented by the Chemical formula 2 is suitable.

In general, an organic solvent having an SP value of less than 8.9 has extremely poor solubility in water. For this reason, such an organic solvent tends to be separated so that it is not usable for aqueous ink like that of the present invention. In addition, drying property and beading of an organic solvent having an SP value of greater than 12.0 are inferior. Therefore, it is not suitable for use.

The SP value is defined by the regular solution theory introduced by Hildebrand) and indicates the solubility of a two-component system solution. In addition, the SP value in the present disclosure is calculated by Fedors method. The SP value is represented by root square of the cohesion energy density in the regular solution theory and the unit is $(J/cm^3)^{0.5}$. It can be calculated by simple software available on the market.

Examples of the amide compound represented by the chemical formula 1 are compounds represented by the following Chemical structures 1 to 3.

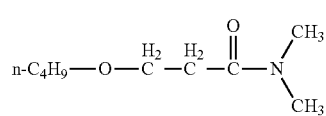

Chemical structure 1

SP value: 9.03

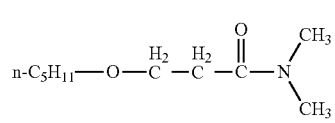

Chemical structure 2

SP value: 9.00

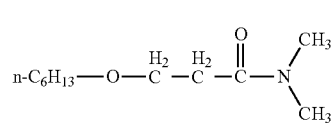

Chemical structure 3

SP value: 8.96

Examples of the oxetan compound represented by the Chemical formula 2 are compounds represented by the following Chemical structures 4 and 5.

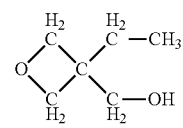

Chemical structure 4

SP value: 11.31

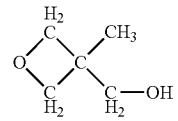

Chemical structure 5

SP value: 11.79

The proportion of the organic solvent X is preferably 20 percent by mass or more and more preferably 20-60 percent by mass to the total mass of ink. When the proportion is 20 percent by mass or more, beading or color bleeding between colors on commercial printing paper is sufficiently suppressed. In addition, when the proportion is 60 percent by mass or less, discharging stability of the ink is not degraded due to increase of viscosity of the ink.

Furthermore, when the glycolether compound (compound Z) having a vapor pressure of 50 mmHg or greater at 100 degrees C. is included as the organic solvent, drying property of the ink is improved even for commercial printing paper. Also, if an image portion contacts the transfer roller immediately after drying at 100 degrees C., the image is not transferred thereto so that higher productivity is secured.

Compounds dissolved in pure water are suitable as the compound Z.

Specific examples thereof include, but are not limited to, propylene glycol monopropylether (boiling point: 150 degrees C., vapor pressure: 107 mmg), propylene glycol monoethylether (boiling point: 133 degrees C., vapor pressure: 252 mmg), propylene glycol monomethylether (boiling point: 120 degrees C., vapor pressure: 360 mmg), propylene glycol monobutylether (boiling point: 170 degrees C., vapor pressure: 59 mmg), 3-methoxy-1-butanol (boiling point: 161 degrees C., vapor pressure: 76 mmg), and 3-methoxy-3-methyl-1-butanol (boiling point: 174 degrees C., vapor pressure: 50 mmg).

The mass ratio of the organic solvent X to the compound Z in the ink is 1:1-8:1. Preferably, it is 3:1-5:1. When this ratio is less than 1:1, that is, the organic solvent X is less than the compound Z, drying property is improved excessively so that the inside of the inkjet head is dried. This causes a problem about discharging stability. In addition, when the ratio surpasses 8:1, the content of the organic solvent X is excessive, causing degradation of drying property on commercial printing paper, thereby degrading productivity.

The total proportion of the organic solvent in the ink containing the organic solvent X and the compound Z is preferably from 30-60 percent by mass. When the mass ratio is 30 percent by mass or more, beading on commercial printing paper is sufficiently suppressed. When the mass ratio is 60 percent by mass or less, it is highly unlikely that viscosity increases excessively, causing problems with regard to discharging stability.

Coloring Material

The coloring material includes a surfactant dispersion pigment in which a pigment is dispersed by a surfactant, a resin dispersion pigment in which a pigment is dispersed by a resin, a resin coverage dispersion pigment in which the surface of a pigment is covered with a resin, a self-dispersion pigment in which a hydrophilic group is provided to the surface of a pigment, etc. Coloring materials having water dispersibility are suitable. Of these, it is good to use the resin coverage pigment or self dispersion pigment having at least one hydrophilic group on the surface of a pigment.

Specific examples of such hydrophilic groups include —COOM, —$SO_3$M, —$PO_3$HM, —$PO_3M_2$, —$CONM_2$, —$SO_3NM_2$, —NH—$C_6H_4$—COOM, —NH—$C_6H_4$—$SO_3$M, —NH—$C_6H_4$—$PO_3$HM, —NH—$C_6H_4$—$PO_3M_2$, —NH—$C_6H_4$—$CONM_2$, and —NH—$C_6H_4$—$SO_3NM_2$. These hydrophilic groups can be introduced by known methods.

In addition, the counter ion M is, for example, quaternary ammonium ion.

Specific examples of thereof include, but are not limited to, tetramethyl ammonium ion, tetraethyl ammonium ion, tetrapropyl ammonium ion, tetrabutyl ammonium ion, tetra pentyl ammonium ion, benzyl trimethyl ammonium ion, benzyl triethyl ammonium ion, and tetrahexyl ammonium ion. Of these, tetraethyl ammonium ion, tetrabutyl ammonium ion, and benzyl trimethyl ammonium ion are preferable and tetrabutyl ammonium ion is particularly preferable.

The ink using the pigment mentioned above particularly has excellent storage stability over time and the viscosity rise during moisture vaporing is suppressed. This is because even when moisture is evaporated from water rich ink so that the ink becomes organic solvent rich, dispersion of a pigment is inferred to be kept stable by the hydrophilic group having a quaternary ammonium ion.

A polymer emulsion having a polymer particulate including a pigment can be preferably used as the coloring material other than the pigment having the hydrophilic group. The pigment can be encapsulated in a polymer particulate or adsorbed to the surface thereof. In this case, it is not necessary that all the pigments are encapsulated or adsorbed. Coloring materials in which only some of the pigments are dispersed in the emulsion are also allowable.

Specific examples of the polymer for polymer particulate include, but are not limited to, vinyl-based polymers, polyester-based polymers, and polyurethane-based polymers. Of these, the vinyl-based polymers and the polyester-based polymers are particularly suitable.

In addition, typical organic pigments and complex pigments covering inorganic pigment particles with an organic pigment or carbon black can be used. The complex pigment can be manufactured by a method including precipitating organic pigments under the presence of inorganic pigments, a mechanochemical method including mechanically mixing and grinding inorganic pigments and organic pigments, etc. Optionally, it is possible to provide an organosilane compound layer formed of polysiloxane and alkylsilane between inorganic pigments and organic pigments to improve attachability between them.

The mass ratio of inorganic pigment particles and organic pigments of coloring material or carbon black is preferably 3:1-1:3 and more preferably 3:2-1:2. When the ratio of the coloring material is small, coloring property may deteriorate. As the coloring material increases, transparency and saturation may deteriorate.

Specific examples of the complex pigments available on the market include, but are not limited to, silica/carbon black complex material, silica/phthalocyanine complex material (PB15:3), silica/disazo yellow complex material, and silica/quinacridone complex material (PR122) (manufactured by TODAKOGYO CORP.) because these have small primary particle diameters.

When inorganic pigment particles having a primary particle diameter of 20 nm are covered with an equivalent amount of organic pigments, the primary particle diameter of the pigment is about 25 nm. If a suitable dispersant is used to disperse the pigment to the degree of the primary particle diameter, it is possible to manufacture ultrafine pigment dispersion ink having a dispersion particle diameter of 25 nm. With regard to the complex material, the organic pigment on the surface thereof contributes to dispersion and the feature of the inorganic pigment disposed in the center of the complex material demonstrates through the thin layer of the organic pigment having a thickness of about 2.5 nm. Therefore, a pigment dispersant to stably disperse both at the same time has to be selected.

Specific examples of the inorganic pigments include, but are not limited to, titanium oxide, iron oxide, calcium oxide, barium sulfate, aluminum hydroxide, barium yellow, cadmium red, chrome yellow, and carbon black. Of these, carbon black is particularly preferable. For example, channel black, furnace black, gas black, and lamp black manufactured by a known method such as a contact method, a furnace method, and a thermal method are suitable.

Specific examples of the organic pigments include, but are not limited to, azo pigments, polycyclic pigments, dye chelate, nitro pigments, nitroso pigments, and aniline black. Of these, azo pigments and polycyclic pigments are preferable. Specific examples of the azo pigments include, but are not limited to, azo lake, insoluble azo pigments, condensation azo pigments, and chelate azo pigments. Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, and quinofuranone pigments. The dye chelate includes, but are not limited to, basic dye type chelate, and acidic dye type chelate.

Specific examples of the organic pigment include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 139, 150, 151, 153, 155, 180, 183, 185 and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

BET specific surface area of the pigment is preferably about 10-about 1,500 $m^2/g$, more preferably about 20-about 600 $m^2/g$, and most preferably about 50-about 300 $m^2/g$.

Unless a pigment having such a suitable specific surface area is available, it is possible to reduce the size of the pigment or pulverize the pigment by using, for example, a ball mill, a jet mill, or ultrasonic wave to obtain a relatively small particle diameter.

The volume average particle diameter ($D_{50}$) of the water dispersible coloring material is preferably 10-200 nm in the ink.

The proportion of the water dispersible coloring material in the ink is preferably from 1-15% by mass and more preferably from 2-10 percent by mass in a solid form. When the proportion is not less than 1% by mass, the coloring of the ink and the image density are improved. When the proportion is not greater than 15 percent by mass, the ink does not thicken so that deterioration of discharging property can be prevented and it is preferable in terms of economy.

Dyes can be used in combination to adjust color tone. However, it should be used within a range having no adverse impact on weather resistance.

Surfactant

Using a polyether-modified siloxane compound is preferable as a surfactant. This makes ink not easy to be wet on a head nozzle plate ink repelling layer. Therefore, defective discharging caused by ink attachment to a nozzle can be prevented and discharging stability is improved. In addition, ink is not easily attached to the surface of a nozzle ink repelling layer which tends to create a problem. The ink is free of defective discharging.

Of these, it is preferable to select surfactants represented by chemical formula 3 to chemical formula 6. In particular, surfactants having a low dynamic surface tension, a high permeability, and an excellent leveling property without degrading dispersion stability irrespective of the kind of the water-dispersible coloring material and the combinational use of the organic solvents.

These surfactants can be used alone or in combination.

Chemical formula 3

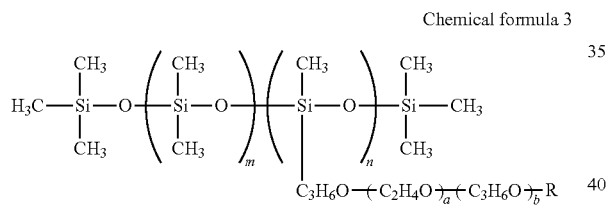

In the Chemical formula 3, R represents a hydrogen atom or an alkyl group having 1 to 4 carbon atoms, "m" represents 0 or an integer of 1-23, "n" represents an integer of 1-10, "a" represents an integer of 1-23, and "b" represents 0 or an integer of 1-23.

Examples of the compound represented by the Chemical formula 3 are compounds represented by the following chemical structures 6 to 13.

Chemical structure 6

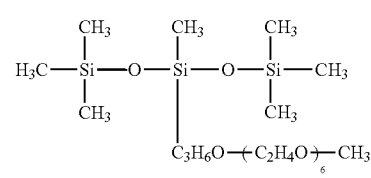

Chemical structure 7

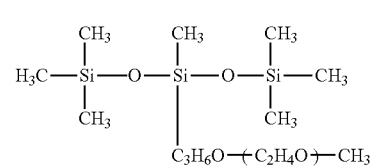

Chemical structure 8

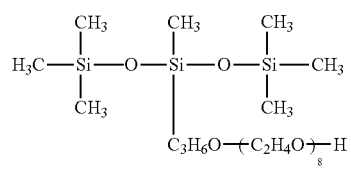

Chemical structure 9

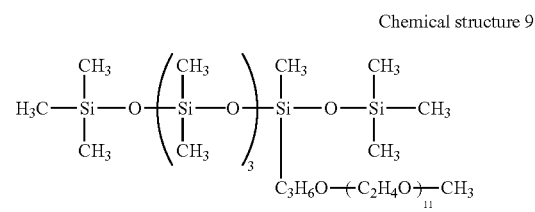

Chemical structure 10

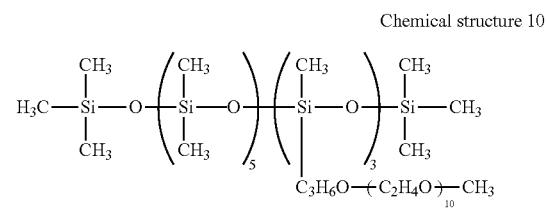

Chemical structure 11

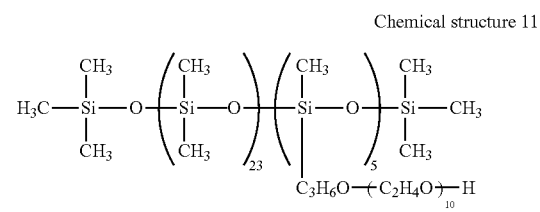

Chemical structure 12

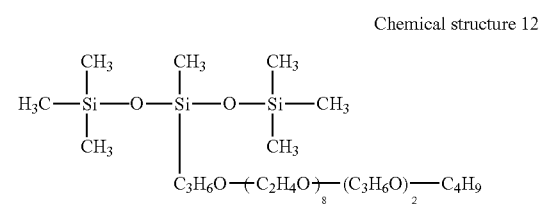

Chemical structure 13

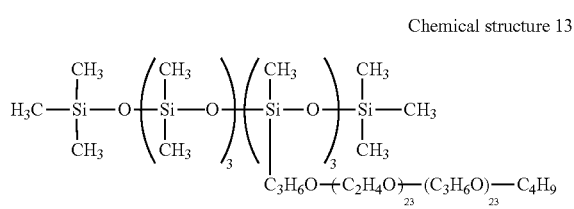

Chemical formula 4

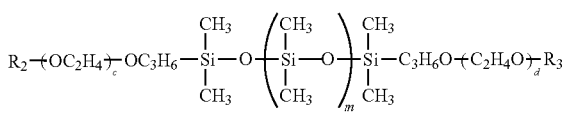

In the chemical formula 4, $R_2$ and $R_3$ each, independently represent hydrogen atoms or alkyl groups having 1 to 4 carbon atoms, "m" represents an integer of 1-8, "c" and "d" each, independently represent integers of 1-10.

Examples of the compound represented by the Chemical formula 4 are compounds represented by the following chemical structure 14.

Chemical structure 14

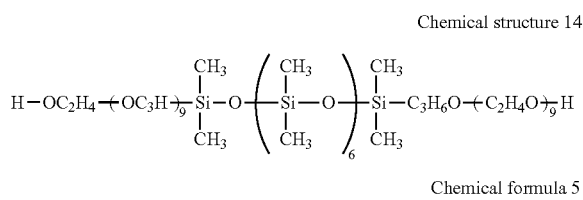

Chemical formula 5

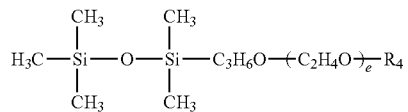

In the Chemical formula 5, $R_4$ represents a hydrogen atom or an alkyl group having 1-4 carbon atoms and "e" represents an integer of 1-8.

Examples of the compound represented by the Chemical formula 5 are compounds represented by the following chemical structure 15.

Chemical structure 15

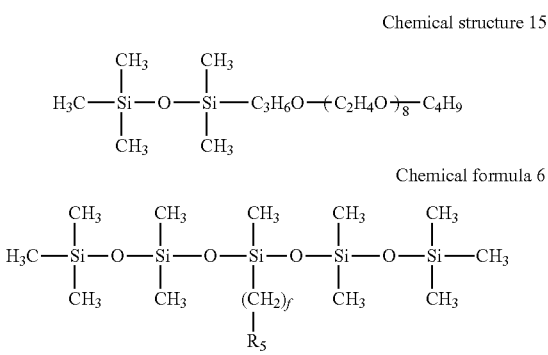

Chemical formula 6

In the chemical formula, $R_5$ represents a polyether group represented by the following Chemical formula A and "f" represents an integer of 1-8.

Chemical formula A

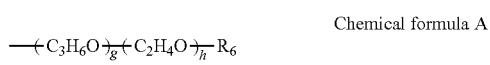

In the Chemical formula A, $R_6$ represents a hydrogen atom or an alkyl group having 1-4 carbon atoms, "g" represents 0 or an integer of 1-23 and "h" represents 0 or an integer of 1-23, excluding the case in which both "g" and "h" are 0 at the same time.

Examples of the compound represented by the Chemical formula 6 are compounds represented by the following chemical structures 16 to 18.

Chemical structure 16

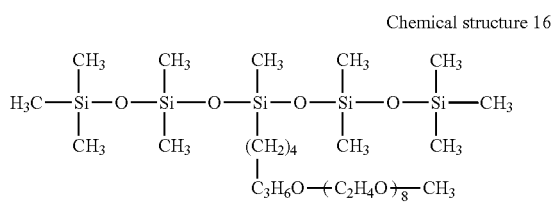

Chemical structure 17

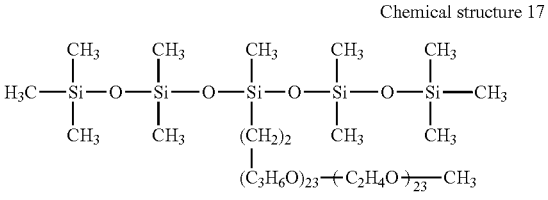

Chemical structure 18

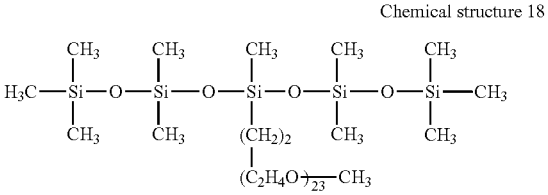

Furthermore, specific examples of polyether-modified siloxane compound surfactants available on the market demonstrating the same feature as the above-mentioned compound include, but are not limited to, 71 ADDITIVE, 74ADDITIVE, 57ADDITIVE, 8029ADDITIVE, 8054ADDITIVE, 8211 ADDITIVE, 8019ADDITIVE, 8526ADDITIVE, and FZ-2123, FZ-2191, all manufactured by Dow Corning Toray Co., Ltd., TSF4440, TSF4441, TSF4445, TSF4446, TSF4450, TSF4452, and TSF4460, all manufactured by Momentive Performance Materials Inc., SILFACE SAG002, SILFACE SAG003, SILFACE SAG005, SILFACE. SAG503A, SILFACE SAG008, and SILFACE SJM0063, all manufactured by Nisshin Chemical Co., Ltd., TEGO_Wet_KL245, TEGO_Wet_250, TEGO_Wet_260, TEGO_Wet_265, TEGO_Wet_270, and TEGO_Wet_280, all manufactured by Evonik Industries AG, and BYK-345, BYK-347 BYK-348, BYK-375, and BYK-377, all manufactured by BYK Japan KK.

In addition, the polyether-modified siloxane compound surfactant, fluoro surfactants, silicone-based surfactants, acetyleneglycol-based or acetylenealcohol-based surfactants can be used in combination.

The proportion of the surfactant in the ink is preferably 0.001-5 percent by mass and more preferably 0.5-3 percent by mass. When the proportion is 0.001 percent by mass or more, the addition of a surfactant has a good impact.

However, when the proportion is not less than 5 percent by mass, the addition impact is saturated, meaning that increasing the proportion furthermore is meaningless.

Other Components

The ink of the present invention contains known additives in addition to the components mentioned above. Examples thereof are permeating agents, foam inhibitors (defoaming agents), water dispersible resins, pH regulators, preservatives and fungicides, chelate reagents, corrosion inhibitors, anti-oxidants, ultraviolet absorbers, oxygen absorbers, and photostabilizing agents.

Permeating Agent

The permeating agent preferably has at least one kind of non-wetting polyol compounds or glycol ether compounds having 8 to 11 carbon atoms. "Non-wetting" means solubility being between 0.2-50 percent by mass in water at 25 degrees C. Of these permeating agents, 1,3-diol compounds represented by the following Chemical formula 7 is preferable. 2-ethyl-1,3-hexanediol (solubility: 4.2 percent at 25 degrees C.) and 2,2,4-trimethyl-1,3-pentanediol (solubility: 2.0 percent at 25 degrees C.) are particularly preferable.

Chemical formula 7

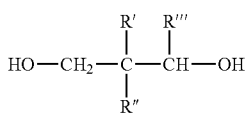

In the Chemical formula 7, R' represents a methyl group or an ethyl group, R" represents a hydrogen or a methyl group, and R''' represents an ethyl group or a propyl group.

Specific examples of the other non-wetting polyol compounds include, but are not limited to, aliphatic diols such as 2-ethyl-2-methyl-1,3-propanediol, 3,3-dimethyl-1,2-butanediol, 2,2-diethyl-1,3-propane diol, 2-methyl-2-propyl-1,3-propane diol, 2,4-dimethyl-2,4-pentanediol, 2,5-dimethyl-2,5-hexanediol, and 5-hexene-1,2-diol.

The proportion of the permeating agent in the ink is preferably 0.5-4 percent by mass and more preferably 1 to 3 percent by weight. When the proportion is not less than 0.5 percent by mass, permeation effect of the ink is easily obtained and image quality is improved. In addition, if the proportion is not greater than 4 percent by mass, the ink is sufficiently dissolved so that no separation occurs and the initial viscosity of the ink is not high.

Foam Inhibitor

A very small amount of a foam inhibitor is added to ink to prevent foaming in the ink.

"Foaming" means liquid forms a thin layer encapsulating air. The properties such as surface tension and viscosity of ink have impacts on generating foams. That is, a force to make the surface area as least as possible is applied to the liquid such as water having a high surface tension so that no or little foaming occurs. To the contrary, ink having a high viscosity and high permeability tends to foam because the surface tension thereof is low so that the foam formed due to the viscosity of the liquid is easily maintained and does not easily burst.

Normally, foam inhibitors locally lower the surface tension of bubble film or foam inhibitors insoluble in a foaming agent is dotted on the surface of the foaming agent to break the bubble. When a polyether-modified siloxane compound surfactant capable of extremely reducing the surface tension as the surfactant and a foam inhibitor of the former mechanism is used, it is not possible to locally reduce the surface tension of a bubble film. Therefore, the latter foam inhibitor insoluble in a foaming liquid is used. However, ink stability deteriorates due to this foam inhibitor insoluble in the solution.

On the other hand, although the foam inhibitor represented by the following Chemical formula 8 is less able to reduce the surface tension than the polyether-modified siloxane compound surfactant, compatibility to the surfactant is good. For this reason, the foam inhibitor is efficiently taken into the a bubble film, so that the surface of the bubble film falls into an unequilibrium state locally due to the difference of the surface tension between the surfactant and the foam inhibitor.

Chemical formula 8

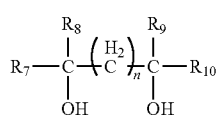

In the Chemical formula 8, $R_7$ and $R_8$ each, independently represent alkyl groups having 3 to 6 carbon atoms, $R_9$ and $R_{10}$ each, independently represent alkyl groups having one or two carbon atoms, and "n" represents an integer of 1-6.

Specific examples of the compound represented by the Chemical formula 8 include, but are not limited to, 2,4,7,9-tetramethyldecane-4,7-diol and 2,5,8,11-tetramethyl dodecane-5,8-diol. Considering foam suppression and compatibility with ink, 2,5,8,11-tetramethyldodecane-5,8-diol is particularly preferable.

The proportion of the foam inhibitor in the ink is preferably from 0.01-10 percent by mass and more preferably 0.1-5 percent by mass. When the proportion is not less than 0.01 percent by mass, defoaming is satisfactory. When the proportion is not greater than 10 percent by mass, foam inhibiting does not hit the peak or no adverse impact on ink properties such as viscosity and particle diameter occurs.

Water-Dispersible Resin

As the water-dispersible resin, resins having excellent film-forming (image forming) property, water repellency, water-resistance, and weather resistance are suitable for image recording of high water-resistance and high image density (high coloring property). For example, condensation-based synthetic resins, addition-based synthetic resins, and natural polymers are suitable.

Specific examples of the condensation-based synthetic resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based synthetic resins include, but are not limited to, polyolefin resins, polystyrene resins, polyvinyl alcohol resins, polyvinyl ester resins, polyacrylic acid resins, and unsaturated carboxylic acid resins.

Specific examples of the natural polymer include, but are not limited to, celluloses, rosins, and natural rubber.

Of these, acrylic-silicone resin particulates and fluororesin particulates are preferable. The water-dispersible resin can be used alone or in combination.

As the water-dispersible resin, self-dispersible resins having a hydrophilic group or resins themselves having no dispersibility while dispersibility is imparted by a surfactant or a resin having a hydrophilic group are suitable.

Of these, emulsions of resin particles obtained by emulsification polymerization or suspension polymerization of ionomers or unsaturated monomers of a polyester resin or polyurethane resin are most suitable.

In the case of emulsification polymerization of an unsaturated monomer, since an unsaturated monomer, a polymerization initiator, a surfactant, a chain transfer agent, a chelate agent, a pH regulator, etc. are added in water to conduct reaction to obtain a resin emulsion, it is easy to obtain a water-dispersible resin and change the resin components. Therefore, a water-dispersible resin having target properties is easily obtained.

Since dispersion breakage or cleavage of molecular chains such as hydrolysis is caused in a strong alkali or strong acid environment, pH is preferably 4-12, more preferably 6-11. It is more preferably 6-11 and furthermore preferably 7-10 in terms of the miscibility with the water-dispersible coloring material.

The average particle diameter ($D_{50}$) of the water-dispersible resin is related to viscosity of the liquid dispersion. If the compositions are the same, viscosity of the same solid portion increases as the particle diameter decreases. To avoid preparing ink having an excessively high viscosity, the average particle diameter ($D_{50}$) of the water-dispersible resin is preferably 50 nm or more. In addition, particles having a particle diameter as large as several tens μm are larger than the size of the nozzle opening of an inkjet head, which is not usable. When particles are smaller than the nozzle opening but large particles are still present in ink, the discharging performance of the ink deteriorates. The average particle diameter ($D_{50}$) of the water-dispersible resin in ink is preferably 200 nm or less and more preferably 150 nm or less not to degrade the ink discharging property.

In addition, the water-dispersible resin fixes the water-dispersible coloring material on paper and forms a film at room temperature to improve the fixing property of the coloring material. Therefore, the minimum film-forming temperature (MFT) of the water-dispersible resin is preferably 30 degrees C. or lower. In addition, when the glass transition temperature of the water-dispersible resin is −40 degrees C. or lower, viscosity of the resin film increases, thereby increasing tackiness of printed matter. Therefore, the glass transition temperature of the water-dispersible resin is preferably −30 degrees C. or higher.

The proportion of the water-dispersible resin in the ink is preferably 0.5-10 percent by mass and more preferably 1-8 percent by mass in a solid form.

pH Regulator

The pH regulator can be any agent capable of adjusting the pH in the range of 7-11 without having an adverse impact on formulated ink and suitably selected to suit to a particular application.

Specific examples thereof include, but are not limited to, alcohol amines, hydroxides of alkali metal elements, hydroxides of ammonium, phosphonium hydroxides, and alkali metal carbonates.

When the pH is less than 7 or greater than 11, an inkjet head or an ink supplying unit tend to be significantly dissolved, which may lead to modification, leakage, poor discharging performance, etc. of the ink.

Specific examples of the alcohol amines include, but are not limited to, diethanol amine, triethanol amine, and 2-amino-2-ethyl-1,3-propane diol.

Specific examples of the hydroxides of alkali metal elements include, but are not limited to, lithium hydroxide, sodium hydroxide, and potassium hydroxide.

Specific examples of the hydroxides of ammonium include, but are not limited to, ammonium hydroxide and quaternary ammonium hydroxide.

A specific example of the phosphonium hydroxides is quaternary phosphonium hydroxide.

Specific examples of the alkali metal carbonates include, but are not limited to, lithium carbonate, sodium carbonate, and potassium carbonate.

Preservatives and Fungicides

Specific examples of the preservatives and fungicides include, but are not limited to, dehydrosodium acetate, sodium sorbinate, 2-pyridine thiol-1-oxide sodium, sodium benzoate, and pentachlorophenol sodium.

Chelate Reagent

Specific examples of the chelate reagents include, but are not limited to, ethylene diamine sodium tetraacetate, nitrilo sodium tri acetate, hydroxyethyl ethylene diamine sodium tri-acetate, diethylenetriamine sodium quinternary acetate, and uramil sodium diacetate.

Corrosion Inhibitor

Specific examples of the corrosion inhibitor include, but are not limited to, acid sulfite, thiosodium sulfate, ammonium thiodiglycolate, diisopropyl ammonium nitrite, pentaerythritol quaternary nitrite, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorber

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

Manufacturing of Ink

The ink of the present disclosure is manufactured by dispersing or dissolving a coloring material, an organic solvent, water, and other optional components in an aqueous medium followed by stirring and mixing, if desired. The stirring and mixing are conducted by a sand mill, a homogenizer, a ball mill, a paint shaker, an ultrasonic dispersing agent, etc. Stirring and mixing can be conducted by a stirrer having a typical stirring wing, a magnetic stirrer, a high speed dispersing device, etc.

Ink Properties

There is no specific limitation to ink properties, which can be suitably selected to suit to a particular application.

However, when the static surface tension of ink is not less than 20 mN/m and the dynamic surface tension thereof is 34 mN/m or less at a bubble life time of 15 msec as measured by maximum bubble pressure technique, wettability to a recording medium is sufficiently secured. In addition, the ink is not wettable to the nozzle blade of tool repelling film of an inkjet head and discharging stability can be secured so that the ink is extremely stable.

Viscosity of the ink is preferably 5-25 mPa·S and more preferably 6-20 mPa·S at 25 degrees C. When the ink viscosity is 5 mPa·s or greater, the printing density and the text quality of the ink are improved.

When the ink viscosity is 25 mPa·S or less, a suitable ink discharging property is secured.

The viscosity can be measured by, for example, a viscometer (RE-550L, manufactured by TOKI SANGYO CO., LTD.) at 25 degree C.

The ink of the present invention is suitably used in any printer having an inkjet head such as a piezoelectric element type which transforms a vibration plate forming the wall of an ink flowing path using a piezoelectric element as a pressure generating device to press ink in the ink flowing path to discharge ink droplets, a thermal type which heats ink in an ink flowing path with a heat element to produce bubbles, and an electrostatic type which transforms a vibration plate forming the wall surface of an ink flowing path by an electrostatic force generated between the vibration plate and an electrode arranged facing the vibration plate to change the volume in the ink flowing path to discharge ink droplets. The ink of the present invention can be accommodated in a container such as an ink cartridge for use.

Recording Medium

There is no specific limitation to the recording medium on which recording is possible using the ink of the present invention. The recording medium can be suitably selected to suit to a particular application. For example, plain paper, gloss paper, special paper, cloth, film, transparent sheets, print sheet for general purpose, etc. are suitable. However, the ink of the present invention is excellent in terms that quality recording is possible on commercial printing paper with the ink as well as other kinds of paper.

The commercial printing paper has a coated layer on at least one side of the substrate of the printing paper. An example thereof is printing paper using a filler such as calcium carbonate and kaolin as the material for the coated layer. Printing coated paper as an example of the commercial printing paper has a coated layer formed of white pigment such as clay (kaolin) or calcium carbonate and an adhesive (binder) such as starch.

Recorded matter having an image formed using the ink of the present invention is high quality free of image blur and has excellent stability over time so that it can be suitably used for various purposes as references, on which texts, images, etc. are recorded.

Of these, in terms of recording images having high quality (image density, saturation, beading, color bleed) and high gloss with excellent smear fixability, a recording medium having a liquid imbibition in a particular range is suitable. Specifically, commercial printing paper having a coated layer on at least one side of the substrate is good. It is preferable that such paper have a transfer amount of pure water to the side of the coated layer of 2-35 mL/m$^2$ in a contact time of 100 ms and 3-40 ml/m$^2$ in a contact time of 400 ms as measured by a liquid dynamic absorption tester. When the transfer amount of pure water is too small, beading (phenomenon in which adjacent dots draw each other, causing the feel of an image rough) and color bleed (blurring between colors) tend to occur. When the transfer amount is too large, the ink dot diameter after recording tends to be smaller than desired, thereby forming a solid image with voids.

The transfer amount of pure water can be measured by a dynamic scanning absorptometer (K350 Series D type, manufactured by KYOWA SEIKO INC.). The transfer amount in the contact time of 100 ms is obtained by interpolation from the measuring result of the transfer amount in the proximity contact time of the contact time.

Printing paper having a liquid imbibition in a particular range is available on the market. Specific examples thereof include, but are not limited to, POD GLOSS COAT, OK TOP COAT+, OK KINFUJI+, and SA KINFUJI+ (manufactured by Oji Paper Co., Ltd.), SUPER MI DUL, AURORA COAT, and SPACE DX (manufactured by Nippon Paper Industries Co., Ltd.), α matte and μ coat (manufactured by Hoketsu Paper Co., Ltd.), RAICHO ART and RAICHO SUPER ART (manufactured by Chuetsu Pulp & Paper Co., Ltd.), and PEARL COAT N (manufactured by Mitsubishi Paper Mills Limited).

Image Forming Method and Image Forming Apparatus

The image forming method of the present disclosure includes an ink discharging process with optional processes such as a stimulus generating process and a control process.

The inkjet recording device of the present invention includes at least an ink discharging device and other suitably selected optional devices such as a stimulus generating device and a control device.

The image forming method of the present invention is executed by the inkjet recording device of the present invention and the ink discharging process is suitably conducted by the ink discharging device. In addition, the other processes are suitably conducted by the other corresponding devices.

Ink Discharging Process (Example of Image Forming Process)

The ink discharging process including applying a stimulus (energy) to ink to jet the ink to form an image on a recording medium. In this process, as the method of forming images on a recording medium by jetting the ink onto the recording medium, any known inkjet recording method can be used. Specific examples of such methods include, but are not limited to, an inkjet recording method of scanning a head and an inkjet recording method using aligned heads to record images on a recording medium.

There is no specific limitation to the system of driving a recording head serving as the ink discharging device in the image forming process. For example, a piezoelectric element actuator using PZT, etc., a system of using a thermal energy, an on-demand type recording head using an actuator, etc. utilizing an electrostatic force, and a charge control type recording head employing continuous spraying system can be used to record images.

In the image forming method of the present invention, a heat drying process can be optionally added after the ink discharging process. For example, recording media can be dried by using an infra red drier, a microwave drier, a roll heater, a drum heater, or warm air.

Moreover, it is also possible to include a fixing process of fixing an image by heating the surface thereof to 100-150 degrees C. by a heating device to smooth and fix the surface of the image. This fixing process improves gloss and fixability of image recorded matter. A roller or a drum heater having a heated mirror surface is suitably used as the heating device and the mirror surface (smoothing portion) of the roller and the drum heater is brought into contact with the image surface. Taking into account image quality, safety, and economy, a fixing roller heated to 100-150 degrees C. is preferable.

The accompanying drawing is a diagram illustrating an example of the image forming apparatus described above.

This drawing is a diagram illustrating a case having the image forming process and the drying process. Reference numerals 1, 2, 3, 4, 5, 6, and 7 represent a recording medium, an ink discharging unit, a transfer belt, a heated wind drier, an image forming unit, a drying processing unit, and a transfer roller, respectively.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto.

Preparation of Pigment Dispersion

Preparation Example 1

Preparation of Surface Reformed Black Pigment Dispersion 1

100 g of Black Pearls® 1000 (carbon black having a BET specific surface area of 343 m$^2$/g and an absorption amount of dibutylphthalate (DBPA) of 105 ml/100 g, manufactured by Cabot Corporation), 100 milimole of sulfanilic acid, and 1 litter of highly deionized water were mixed by a Silverson Mixer at 6,000 rpm in an room temperature environment. Thereafter, 100 milimole of nitric acid was added to the thus-obtained slurry. 30 minutes thereafter, 100 milimole of sodium nitrite dissolved in a 10 mL of highly deionized water was gradually added. Furthermore, the resultant was heated to 60 degrees C. while being stirred to conduct reaction for one hour to obtain a reformed pigment in which sulfanilic acid was added to carbon black. Next, pH of the product was adjusted to 9 with 10 percent tetrabutyl ammonium hydroxide solution (methanol solution) to obtain a reformed pigment dispersion in 30 minutes. Thereafter, subsequent to ultrafiltration by dialysis membrane using the dispersion and highly deionized water followed by ultrasonic dispersion, reformed pigment dispersion having a solid portion accounting for 20 percent was obtained. The surface treatment level of the pigment was 0.75 milimole/g and the volume average particle diameter ($D_{50}$) was 120 nm as measured by a particle size distribution measuring instrument (NANOTRAC UPA-EX150, manufactured by NIKKTSO CO., LTD.).

Preparation Example 2

Preparation of Surface Reformed Black Pigment Dispersion 2

500 g of Black Pearls® 880 (carbon black having a BET specific surface area of 220 $m^2$/g and a DBPA of 105 ml/100 g, manufactured by Cabot Corporation), 1 litter of highly deionized water, and 1 mol of 4-amino benzoate were placed in ProcessAll 4HV mixer (4 Litter) and violently mixed at 300 rpm for 10 minutes while being heated to 60 degrees C. Thereafter, 20 percent sodium nitrite aqueous solution (1 mole equivalent based on 4-amino benzoate) was added to the mixture in 15 minutes and mixed and stirred for three hours while being heated to 60 degrees C. Next, the thus-obtained reaction product was diluted with 750 mL of highly deionized water and taken out. pH of the product was adjusted to 9 with 10 percent tetrabutyl ammonium hydroxide solution (methanol solution) to obtain a reformed pigment dispersion in 30 minutes. The thus-obtained reformed pigment dispersion including a pigment bonded to at least one 4-amino benzoate group or 4-amino benzoate tetrabutyl ammonium salt was subject to ultrafiltration by dialysis membrane with highly deionized water, followed by ultrasonic dispersion to obtain a reformed pigment dispersion having a pigment solid portion of 20 percent. The surface treatment level of the pigment was 0.5 milimole/g and the volume average particle diameter ($D_{50}$) was 104 nm as measured by a particle size distribution measuring instrument (NANOTRAC UPA-EX150, manufactured by NIKKISO CO., LTD.).

Preparation Example 3

Preparation of Surface Reformed Black Pigment Dispersion 3

500 g of Black Pearls® 880 (carbon black having a BET specific surface area of 220 $m^2$/g and a DBPA of 105 ml/100 g, manufactured by Cabot Corporation), 1 litter of highly deionized water, and 175 milimol of 4-amino benzoate were placed in ProcessAll 4HV mixer (4 Litter) and violently mixed at 300 rpm for 10 minutes while being heated to 60 degrees C. Thereafter, 20 percent sodium nitrite aqueous solution (175 milimole equivalent based on 4-amino benzoate) was added to the mixture in 15 minutes and mixed and stirred for three hours while being heated to 60 degrees C. Next, the thus-obtained reaction product was diluted with 750 mL of highly deionized water and taken out. pH of the product was adjusted to 9 with 10 percent tetrethyl ammonium hydroxide aqueous solution to obtain a reformed pigment dispersion in 30 minutes. The thus-obtained reformed pigment dispersion including a pigment bonded to at least one 4-amino benzoate group or 4-amino benzoate tetraethyl ammonium salt was subject to ultrafiltration by dialysis membrane with highly deionized water, followed by ultrasonic dispersion to obtain a reformed pigment dispersion having a pigment solid portion of 20 percent. The surface treatment level of the pigment was 0.35 milimole/g and the volume average particle diameter ($D_{50}$) was 114 nm as measured by a particle size distribution measuring instrument (NANOTRAC UPA-EX150, manufactured by NIKKISO CO LTD.).

Preparation Example 4

Preparation of Surface Reformed Black Pigment Dispersion 4

1 kg of self-dispersion type carbon black pigment dispersion Aqua-Black 162 (solid portion: 19.2 percent, manufactured by TOKAI CARBON CO., LTD.) was subject to acid deposition by 0.1 normal aqueous solution of HCL. Next, pH of the product was adjusted to 9 with 40 percent benzyl trimethyl ammonium hydroxide solution (methanol solution) to obtain a reformed pigment dispersion in 30 minutes. The thus-obtained reformed pigment dispersion including a pigment bonded to at least one carboxylic acid group or carboxylic acid banzyl trimethyl ammonium salt was subject to ultrafiltration by dialysis membrane with highly deionized water, followed by ultrasonic dispersion to obtain a reformed pigment dispersion having a pigment solid portion of 20 percent. The volume average particle diameter ($D_{50}$) was 100 nm as measured by a particle size distribution measuring instrument (NANOTRAC UPA-EX150, manufactured by NIKKISO CO., LTD.).

Preparation Example 5

Preparation of Surface Reformed Black Pigment Dispersion 5

1 kg of pigment dispersion of SENSIJET Black SDP2000 (Solid portion: 14.5 percent, manufactured by SENSIENT Corporation) was subject to acid deposition with 0.1 normal HCL aqueous solution. Next, pH of the product was adjusted to 9 with 10 percent tetrabutyl ammonium hydroxide solution (methanol solution) to obtain a reformed pigment dispersion in 30 minutes. The thus-obtained reformed pigment dispersion including a pigment bonded to at least one carboxylic acid group or sulphonic acid group or carboxylic acid tetrabutyl ammonium salt or sulphonic tetrabutyl ammonium salt was subject to ultrafiltration by dialysis membrane with highly deionized water, followed by ultrasonic dispersion to obtain a reformed pigment dispersion having a pigment solid portion of 20 percent. The volume average particle diameter ($D_{50}$) was 120 nm as measured by a particle size distribution measuring instrument (NANOTRAC UPA-EX150, manufactured by NIKKISO CO., LTD.).

Preparation Example 6

Preparation of Surface Reformed Magenta Pigment Dispersion Element 1

1 kg of SMART Magenta 3122BA (Pigment Red 122 surface treated dispersion, Solid portion: 14.5%, manufactured by SENSIENT Corporation) was subject to acid deposition with 0.1 normal HCL aqueous solution. Next, pH of the product was adjusted to 9 with 10 percent tetraethyl ammonium hydroxide aqueous solution to obtain a reformed pigment dispersion in 30 minutes. The thus-obtained reformed pigment dispersion including a pigment bonded to at least one amino benzoate group or amino benzoate tetraethyl ammonium salt was subject to ultrafiltration by dialysis membrane with highly deionized water, followed by ultrasonic dispersion to obtain a reformed pigment dispersion having a pigment solid portion of 20 percent. The volume average particle diameter ($D_{50}$) was 104 nm as measured by a particle size distribution measuring instrument (NANOTRAC UPA-EX150, manufactured by NIKKISO CO., LTD.).

Preparation Example 7

Preparation of Surface Reformed Cyan Pigment Dispersion Element 1

1 kg of SMART Cyan 3154BA (Pigment Blue 15:4 surface treated dispersion element, Solid portion: 14.5%, manufactured by SENSIENT Corporation) was subject to acid deposition with 0.1 normal HCL aqueous solution. Next, pH of the product was adjusted to 9 with 40 percent benzyl trimethyl ammonium hydroxide solution (methanol solution) to obtain a reformed pigment dispersion in 30 minutes. The thus-obtained reformed pigment dispersion including a pigment bonded to at least one amino benzoate group or amino benzoate benzyltrimethyl ammonium salt was subject to ultrafiltration by dialysis membrane with highly deionized water, followed by ultrasonic dispersion to obtain a reformed pigment dispersion having a pigment solid portion of 20 percent. The volume average particle diameter ($D_{50}$) was 116 nm as measured by a particle size distribution measuring instrument (NANOTRAC UPA-EX150, manufactured by NIKKISO CO., LTD.).

Preparation Example 8

Preparation of Surface Reformed Yellow Pigment Dispersion 1

Next, pH of 1 kg of SMART Yellow 3074BA (Pigment Yellow 74 surface treated dispersion, solid portion: 14.5%, manufactured by SENSIENT Corporation) was adjusted to 9 with 10 percent tetrabutyl ammonium hydroxide solution (methanol solution) to obtain a reformed pigment dispersion in 30 minutes. The thus-obtained reformed pigment dispersion including a pigment bonded to at least one amino benzoate group or amino benzoate tetrabutyl ammonium salt was subject to ultrafiltration by dialysis membrane with highly deionized water, followed by ultrasonic dispersion to obtain a reformed pigment dispersion having a pigment solid portion of 20 percent. The volume average particle diameter ($D_{50}$) was 145 nm as measured by a particle size distribution measuring instrument (NANOTRAC UPA-EX150, manufactured by NIKKISO CO., LTD.).

Preparation of Carbon Black Pigment Containing Polymer Particulate Dispersion

Preparation Example 9

Preparation of Polymer Solution A

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed and heated to 65 degrees C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methylethyl ketone were dripped into the flask in two and a half hours. Subsequently, a liquid mixture of 0.8 g of azobismethyl valeronitrile and 18 g of methylethyl ketone was dripped into the flask in half an hour.

After one-hour aging at 65 degrees C., 0.8 g of azobismethyl valeronitrile was added and aged for another hour. After the reaction was complete, 364 g of methylethyl ketone was added to the flask to obtain 800 g of a polymer solution A having a concentration of 50 percent.

Preparation of Carbon Black Pigment Containing Polymer Particulate Dispersion 28 g of the polymer solution A, 42 g of C.I. carbon black (FW100, manufactured by Degussa AG), 13.6 g of 1 mol/l potassium hydroxide solution, 20 g of methylethyl ketone, and 13.6 g of deionized water were sufficiently stirred and thereafter mixed and kneaded with a roll mill. The thus-obtained paste was charged in 200 g of pure water. Subsequent to sufficient stirring, methylethyl ketone and water were distilled away by using an evaporator. To remove coarse particles, the liquid dispersion was filtered with a polyvinylidene fluoride membrane filter having an average opening diameter of 5.0 μm under pressure to obtain a carbon black pigment containing polymer particulate liquid dispersion having a pigment solid portion of 15% and a solid portion concentration of 20 percent. In addition, the volume average particle diameter ($D_{50}$) of the polymer particulate in the liquid dispersion was 104 nm as measured by a particle size distribution measuring instrument (NANOTRAC UPA-EX150, manufactured by NIKKISO CO., LTD.).

Preparation of Water-Dispersible Resin Dispersion

Preparation Example 10

Preparation of Acrylic-Silicone Polymer Particulate having Dispersion

After sufficient replacement with nitrogen gas in a flask equipped with a mechanical stirrer, a thermometer, a nitrogen gas introducing tube, a reflux tube, and a dripping funnel, 8.0 g of LATEMUL S-180 (reactive anionic surfactant, manufactured by Kao Corporation) was admixed with 350 g of deionized water and heated to 65 degrees C.

Thereafter, 3.0 g of t-butylperoxy benzoate serving as reaction initiator and 1.0 g of sodium isoascorbiate were added to the mixture and five minutes later, a mixture of 45 g of methylmethacrylate, 160 g of methacrylic acid-2-ethylhexyl, 5 g of acrylic acid, 45 g of butylmethacrylate, 30 g of cyclohexyl methacrylate, 15 g of vinyltriethoxysilane, 8.0 g of LATEMUL S-180, and 340 g of deionized water were dripped to the resultant in three hours. Subsequent to heating at 80 degrees C. for two-hour aging, the resultant was cooled down to room temperature. pH of the resultant was adjusted to 7-8 by sodium hydroxide. Thereafter, ethanol was distilled away by an evaporator followed by moisture adjustment to obtain 730 g of acrylic-silicone polymer particulate dispersion having a solid portion of 40 percent. In addition, the volume average particle diameter ($D_{50}$) of the polymer particulate in the dispersion was 125 nm as measured by a particle size distribution measuring instrument (NANOTRAC UPA-EX150, manufactured by NIKKISO CO., LTD.).

Preparation of Ink

Example 1

30 parts of 3-n-buthoxy-N,N-dimethyl propaneamide represented by the Chemical structure 1, 10 parts of propylene glycol monopropylether, 2 parts of 2,2,4-trimethyl-1,3-pentanediol, and 0.5 parts of 2,4,7,9-tetramethyl decane-4,7-diol were charged in a vessel equipped with a stirrer and mixed and stirred for 30 minutes. Thereafter, 0.05 parts of preservatives and fungicides (Proxel GXL, manufactured by AVECIA GROUP), 0.2 parts of 2-amino-2-ethyl-1,3-propane diol, 30 parts of the surface remodeled black pigment dispersion 1 of Preparation Example 1, and highly pure water in an amount to make the total content to be 100 parts were added to the mixture and mixed and stirred for 60 minutes. Thereafter, the thus-obtained mixture was filtrated with a polyvinilydene fluoride membrane filter having an average hole diameter of 1.2 μm under pressure to remove coarse particles and dust. Thus, ink of Example 1 was obtained.

Example 2

25 parts of 3-ethyl-3-hydroxymethyl oxetan represented by the Chemical structure 4, 10 parts of propylene glycol monopropylether, 5 parts of glycerin, 2 parts of 2-ethyl-1,3-hexanediol, 2 parts of polyether-modified siloxane compound represented by the Chemical structure 7, and 0.5 parts of 2,4,7,9-tetramethyl decane-4,7-diol were charged in a vessel equipped with a stirrer and mixed and stirred for 30 minutes. Thereafter, 0.05 parts of preservatives and fungicides (Proxel GXL, manufactured by AVECIA GROUP), 0.2 parts of 2-amino-2-ethyl-1,3-propane diol, 30 parts of the surface remodeled black pigment dispersion 1 of Preparation Example 1, and highly pure water were added to the mixture and mixed and stirred for 60 minutes. Furthermore, 11.0 parts of polyurethane dispersion (TAKELAC™, W-6110, manufactured by Mitsui Chemicals, Inc.) and highly pure water in an amount to make the total to be 100 parts were added to the mixture and mixed and stirred for 30 minutes. Thereafter, the thus-obtained mixture was filtrated with a polyvinilydene fluoride membrane filter having an average hole diameter of 1.2 μm under pressure to remove coarse particles and dust. Thus, ink of Example 2 was obtained.

Examples 3 to 18 and Comparative Examples 1 to 5

The organic solvents, the surfactants, and the defoaming agents shown in each column of Examples 3 to 18 and Comparative Examples 1 to 5 were mixed and stirred, thereafter the preservatives and fungicides, the pH regulators, and the water-dispersible coloring materials (pigment dispersions) shown in each column of Examples 3 to 18 and Comparative Examples 1 to 5 were mixed and stirred, and the water-dispersible resins shown in each column of Examples 3 to 18 and Comparative Examples 1 to 5 was mixed and stirred in the same manner as in Examples 1 and 2. Thereafter, the thus-obtained mixture was filtrated with a polyvinilydene fluoride membrane filter having an average opening diameter of 1.2 μm under pressure to remove coarse particles and dust. Thus, each ink of Examples and Comparative Examples was obtained.

TABLE 1

| | | | Example | | | | | | | | |
|---|---|---|---|---|---|---|---|---|---|---|---|
| | | | 1 | 2 | 3 | 4 | 5 | 6 | 7 | 8 | 9 |
| Coloring material (pigment dispersion) | | Preparation Example 1 | 30.00 | 30.00 | 30.00 | 30.00 | — | — | — | — | — |
| | | Preparation Example 2 | — | — | — | — | 30.00 | — | — | — | — |
| | | Preparation Example 3 | — | — | — | — | — | 30.00 | — | — | — |
| | | Preparation Example 4 | — | — | — | — | — | — | 30.00 | — | — |
| | | Preparation Example 5 | — | — | — | — | — | — | — | 30.00 | — |
| | | Preparation Example 6 | — | — | — | — | — | — | — | — | 30.00 |
| | | Preparation Example 7 | — | — | — | — | — | — | — | — | — |
| | | Preparation Example 8 | — | — | — | — | — | — | — | — | — |
| | | Preparation Example 9 | — | — | — | — | — | — | — | — | — |
| Water-dispersible Resin | | Preparation Example 10 | — | — | 8.75 | 8.75 | — | — | 7.00 | 7.00 | 3.75 |
| | | TAKELAC™ W-6110 | — | 11.00 | — | — | 11.00 | 11.00 | — | — | 6.47 |
| Organic solvent | Organic solvent | Compound of chemical structure 1 (SP value: 9.03) | 30.00 | — | — | — | — | — | 30.00 | 30.00 | — |
| | | Compound of chemical structure 4 (SP value: 11.31) | — | 25.00 | 30.00 | 30.00 | — | 27.00 | — | — | 20.00 |
| | | Compound of chemical structure 5 (SP value: 11.79) | — | — | — | — | 17.00 | — | — | — | — |
| | Glycol ether compound | *1 (vapor pressure at 100 degrees: 107 mmHg) | 10.00 | 10.00 | — | — | — | — | — | — | — |
| | | *2 (vapor pressure at 100 degrees: 360 mmHg) | — | — | 10.00 | 10.00 | — | — | — | — | — |
| | | *3 (vapor pressure at 100 degrees: 252 mmHg) | — | — | — | — | 15.00 | 5.00 | — | — | — |
| | | *4 (vapor pressure at 100 degrees: 59 mmHg) | — | — | — | — | — | — | 7.50 | — | — |
| | | *5 (vapor pressure at 100 degrees: 76 mmHg) | — | — | — | — | — | — | — | 7.50 | — |
| | | *6 (vapor pressure at 100 degrees: 50 mmHg) | — | — | — | — | — | — | — | — | 15.00 |
| | | *7 (boiling point: 212 degrees C.) | | | | | | | | | |

TABLE 1-continued

|  |  |  |  |  |  |  |  |  |  |  |
|---|---|---|---|---|---|---|---|---|---|---|
| Humectant | *8 (SP value: 16.38) | — | 5.00 | — | — | — | — | — | — | — |
|  | *9 (SP value: 15.4) | — | — | — | — | — | — | — | — | — |
| Permeating | *10 (SP value: 10.6) | — | 2.00 | 2.00 | 2.00 | — | — | 2.00 | 1.00 | 2.00 |
| agent | *11 (SP value: 10.8) | 2.00 | — | — | — | 2.00 | 2.00 | — | — | — |
| Surfactant | Siloxane compound of chemical structure 7 | — | 2.00 | — | — | — | — | — | — | 2.00 |
|  | Siloxane compound of chemical structure 9 | — | — | — | 2.00 | — | — | — | — | — |
|  | Siloxane compound of chemical structure 10 | — | — | — | — | 2.00 | — | — | — | — |
|  | TEGO Wet 270 | — | — | — | — | — | 2.00 | — | 3.00 | — |
|  | SILFACE SAG503A | — | — | — | — | — | — | 1.00 | — | — |
|  | UNIDYNE™ DSN403N | — | — | — | — | — | — | — | — | — |
|  | SOFTANOL EP7025 | — | — | 2.00 | — | — | — | — | — | — |
| Preservatives and fungicides | Proxel GXL | 0.05 | 0.05 | 0.05 | 0.05 | 0.05 | 0.05 | 0.05 | 0.05 | 0.05 |
| Foam suppressor (defoaming agent) | *12 | 0.50 | 0.50 | 0.50 | 0.50 | — | — | 0.40 | 0.40 | 0.40 |
|  | *13 | — | — | — | — | 0.40 | 0.40 | — | — | — |
| pH Regulator | *14 | 0.20 | 0.20 | 0.20 | 0.20 | 0.20 | 0.10 | 0.10 | 0.20 | 0.20 |
| Highly pure water |  | Rest | Rest | Rest | Rest | Rest | Rest | Rest | Rest | Rest |
| Total (Percent by mass) |  | 100 | 100 | 100 | 100 | 100 | 100 | 100 | 100 | 100 |
| Organic solvent X/Compound Z |  | 3/1 | 2.5/1 | 3/1 | 3/1 | 1.13/1 | 5.4/1 | 4/1 | 4/1 | 1.33/1 |

|  | Example |  |  |  |  |  |  |  |  |
|---|---|---|---|---|---|---|---|---|---|
|  | 10 | 11 | 12 | 13 | 14 | 15 | 16 | 17 | 18 |
| Coloring material (pigment dispersion) | — | — | — | — | — | — | — | — | — |
|  | — | — | — | — | — | — | — | — | — |
|  | — | — | — | — | — | — | — | — | — |
|  | — | — | — | — | — | — | — | — | — |
|  | 30.00 | 30.00 | — | — | — | — | — | — | — |
|  | — | — | 17.50 | 17.50 | — | — | — | — | — |
|  | — | — | — | — | 17.50 | 17.50 | 17.50 | — | 17.50 |
|  | — | — | — | — | — | — | — | 40.00 | — |
| Water-dispersible Resin | 3.75 | 3.75 | 15.00 | 15.00 | 12.50 | 12.50 | 12.50 | — | 12.50 |
|  | 6.47 | 6.47 | — | — | 3.23 | 3.23 | 3.23 | — | 3.23 |
| Organic solvent | — | — | — | — | — | — | — | — | — |
|  | — | — | 33.00 | 25.00 | 39.00 | 36.00 | 33.00 | 27.00 | 33.00 |
|  | 30.00 | 33.00 | — | — | — | — | — | — | — |
|  | 10.00 | — | 10.00 | — | — | — | 10.00 | — | 10.00 |
|  | — | 5.00 | — | 15.00 | 5.00 | — | — | 5.00 | — |
|  | — | — | — | — | — | 5.00 | — | — | — |
|  | — | — | — | 3.00 | — | — | — | — | — |
|  | — | — | — | — | — | — | — | — | — |
|  | — | — | — | — | — | — | — | — | — |
|  | 2.00 | 2.00 | 2.00 | — | 2.00 | 2.00 | 2.00 | 2.00 | 2.00 |
|  | — | — | — | — | — | — | — | — | — |
| Surfactant | — | — | — | — | — | 2.00 | 2.00 | — | — |
|  | 2.00 | — | — | — | — | — | — | 1.00 | — |
|  | — | 3.00 | — | — | — | — | — | — | — |
|  | — | — | — | 2.00 | 2.00 | — | — | — | — |
|  | — | — | 2.00 | — | — | — | — | — | — |
|  | — | — | — | — | — | — | — | — | 0.10 |
|  | — | — | — | — | — | — | — | — | — |
| Preservatives and fungicides | 0.05 | 0.05 | 0.05 | 0.05 | 0.05 | 0.05 | 0.05 | 0.05 | 0.05 |
| Foam suppressor (defoaming agent) | 0.40 | 0.40 | 0.40 | — | — | 0.40 | 0.40 | 0.40 | 0.40 |
|  | — | — | — | 0.40 | 0.40 | — | — | — | — |
| pH Regulator | 0.20 | 0.20 | 0.20 | 0.10 | 0.10 | 0.20 | 0.20 | 0.20 | 0.20 |
| Highly pure water | Rest | Rest | Rest | Rest | Rest | Rest | Rest | Rest | Rest |
| Total (Percent by mass) | 100 | 100 | 100 | 100 | 100 | 100 | 100 | 100 | 100 |
| Organic solvent X/Compound Z | 3/1 | 6.6/1 | 3.3/1 | 1.38/1 | 7.8/1 | 7.2/1 | 3.3/1 | 5.4/1 | 3.3/1 |

TABLE 2

|  |  | Comparative Example | | | | |
|---|---|---|---|---|---|---|
|  |  | 1 | 2 | 3 | 4 | 5 |
| Coloring material (pigment dispersion) | Preparation Example 1 | — | — | — | — | — |
|  | Preparation Example 2 | — | — | — | — | — |
|  | Preparation Example 3 | — | — | — | — | — |
|  | Preparation Example 4 | — | — | — | — | — |
|  | Preparation Example 5 | — | — | — | — | — |
|  | Preparation Example 6 | 30.00 | 30.00 | — | — | — |
|  | Preparation Example 7 | — | — | 17.50 | 17.50 | 17.50 |
|  | Preparation Example 8 | — | — | — | — | — |
|  | Preparation Example 9 | — | — | — | — | — |
| Water-dispersible Resin | Preparation Example 10 | 3.75 | 3.75 | 15.00 | 15.00 | 15.00 |
|  | TAKELAC™ W-6110 | 6.47 | 6.47 | — | — | — |
| Organic solvent / Organic solvent | Compound of chemical structure 1 (SP value: 9.03) | — | — | — | — | — |
|  | Compound of chemical structure 4 (SP value: 11.31) | — | — | 33.00 | 20.00 | 34.00 |
|  | Compound of chemical structure 5 (SP value: 11.79) | 40.00 | — | — | — | — |
| Glycol ether compound | *1 (vapor pressure at 100 degrees: 107 mmHg) | — | — | — | 23.00 | 4.00 |
|  | *2 (vapor pressure at 100 degrees: 360 mmHg) | — | — | — | — | — |
|  | *3 (vapor pressure at 100 degrees: 252 mmHg) | — | — | — | — | — |
|  | *4 (vapor pressure at 100 degrees: 59 mmHg) | — | — | — | — | — |
|  | *5 (vapor pressure at 100 degrees: 76 mmHg) | — | — | — | — | — |
|  | *6 (vapor pressure at 100 degrees: 50 mmHg) | — | — | — | — | — |
|  | *7 (boiling point: 212 degrees C.) | — | — | 10.00 | — | — |
| Humectant | *8 (SP value: 16.38) | — | 30.00 | — | — | — |
|  | *9 (SP value: 15.4) | — | 10.00 | — | — | — |
| Permeating agent | *10 (SP value: 10.6) | 2.00 | 2.00 | 2.00 | 2.00 | 2.00 |
|  | *11 (SP value: 10.8) | — | — | — | — | — |
| Surfactant | Siloxane compound of chemical structure 7 | — | — | — | — | — |
|  | Siloxane compound of chemical structure 9 | 2.00 | 2.00 | — | — | — |
|  | Siloxane compound of chemical structure 10 | — | — | — | — | — |
|  | TEGO Wet 270 | — | — | — | — | — |
|  | SILFACE SAG503A | — | — | 2.00 | 2.00 | 2.00 |
|  | UNIDYNE™ DSN403N | — | — | — | — | — |
|  | SOFTANOL EP7025 | — | — | — | — | — |
| Preservatives and fungicides | Proxel GXL | 0.05 | 0.05 | 0.05 | 0.05 | 0.05 |
| Foam suppressor (defoaming agent) | *12 | 0.40 | 0.40 | 0.40 | 0.40 | 0.40 |
|  | *13 | — | — | — | — | — |
| pH Regulator | *14 | 0.20 | 0.20 | 0.20 | 0.20 | 0.20 |
| Highly pure water |  | Rest | Rest | Rest | Rest | Rest |
| Total (Percent by mass) |  | 100 | 100 | 100 | 100 | 100 |
| Organic solvent X/Compound Z |  | 1/0 | — | 1/0 | 0.87/1 | 8.5/1 |

Details of abbreviations, etc., shown in Tables 1 and 2 are as follows:

TAKELAC™ W-6110: Polyurethane dispersion, solid portion 30.9 percent, Tg=−20 degrees C., manufactured by Mitsui Chemicals, Inc.)

Compound represented by Chemical structure 1: 3-n-buthoxy-N,N-dimethyl propaneamide Compound represented by Chemical structure 4: 3-ethyl-3-hydroxymethyl oxetane Compound represented by Chemical structure 5: 3-methyl-3-hydroxymethyl oxetane

*1: Propylene glycol mono-propylether
*2: Propylene glycol monomethylether
*3: Propylene glycol monoethylether
*4: Propylene glycol monobutylether
*5: 3-methoxy-1-butanol
*6: 3-methoxy-3-methyl-1-butanol
*7: Dipropylene glycol-n-propyl ether
*8: Glycerin
*9: Triethylene glycol
*10: 2-ethyl-1,3-hexanediol
*11: 2,2,4-trimethyl-1,3-pentanediol TEGO Wet 270 (polyether-modified siloxane compound (manufactured by Evonik Industries AG, effective component: 100 percent)

SILFACE SAG503A: (polyether-modified siloxane compound (effective component: 100 percent, manufactured by Nisshin Chemical Co., Ltd.)

UNIDYNE™ DSN403N: Polyoxyethylene perfluoroalkyl ether (effective component 100 percent, manufactured by DAIKIN INDUSTRIES, Ltd.)
SOFTANOL EP-7025: Higher alcohol ethoxylate compound (effective component: 100 percent, manufactured by Nippon Shokubai Co., Ltd.)
Proxel GXL: Preservatives and fungicides mainly composed of 1,2-benzisothiazolin-3-one (component: 20% by weight, containing dipropylene glycol, manufactured by Avecia)
*12: 2,4,7,9-tetramethyldecane-4,7-diol
*13: 2,5,8,11-tetramethyldodecane-5,8-diol
*14: 2-amino-2-ethyl-1,3-propane diol Properties of each ink of Examples 1 to 18 and Comparative Examples 1 to 5 were evaluated in the following manner. The results are shown in Table 3.

Viscosity

Viscosity of the ink was measured at 25 degrees C. using a viscometer (RE-85L, manufactured by TOKI SANGYO CO., LTD.).

pH pH of the ink was measured at 25 degrees C. using a pH meter (HM-30R type, manufactured by DKK-TOA CORPORATION).

Dynamic Surface Tension

Dynamic surface tension of the ink was measured at 25 degrees C. at a surface life time of 15 msec by SITA_DynoTester (manufactured by SITA Messtechnik GmbH) as measured by maximum bubble pressure technique.

Static Surface Tension

Viscosity of the ink was measured at 25 degrees C. using an automatic surface tensiometer (DY-300, manufactured by KYOWA INTERFACE SCIENCE Co., Ltd.).

TABLE 3

| | Ink Properties | | | |
|---|---|---|---|---|
| | Viscosity (mPa · s) | pH | 15 msec dynamic surface tension (mN/m) | Static surface tension (mN/m) |
| Example 1 | 6.6 | 9.4 | 42.3 | 35.9 |
| Example 2 | 8.6 | 9.5 | 29.7 | 22.2 |
| Example 3 | 7.8 | 9.6 | 36.7 | 29.7 |
| Example 4 | 8.1 | 9.5 | 29.6 | 21.9 |
| Example 5 | 7.0 | 9.4 | 29.2 | 21.8 |
| Example 6 | 6.8 | 9.2 | 28.9 | 21.4 |
| Example 7 | 7.5 | 9.1 | 29.6 | 22.2 |
| Example 8 | 7.4 | 9.5 | 27.4 | 20.6 |
| Example 9 | 8.5 | 9.4 | 30.1 | 21.4 |
| Example 10 | 8.3 | 9.6 | 29.5 | 22.0 |
| Example 11 | 8.1 | 9.7 | 29.3 | 21.8 |
| Example 12 | 8.1 | 9.5 | 30.1 | 22.5 |
| Example 13 | 8.6 | 9.4 | 30.4 | 22.7 |
| Example 14 | 8.6 | 9.5 | 29.2 | 21.9 |
| Example 15 | 8.1 | 9.4 | 28.9 | 21.4 |
| Example 16 | 7.6 | 9.3 | 28.7 | 20.9 |
| Example 17 | 7.9 | 9.6 | 31.5 | 21.7 |
| Example 18 | 7.7 | 9.2 | 31.2 | 20.4 |
| Comparative Example 1 | 8.1 | 9.4 | 29.4 | 21.8 |
| Comparative Example 2 | 8.2 | 9.4 | 31.7 | 22.4 |
| Comparative Example 3 | 8.8 | 9.5 | 31.1 | 22.7 |
| Comparative Example 4 | 8.5 | 9.5 | 30.6 | 22.2 |
| Comparative Example 5 | 7.4 | 9.6 | 29.7 | 21.6 |

Images were formed by using each ink of Examples 1 to 18 and Comparative Examples 1 to 5 in the following manner to evaluate properties. The results are shown in Table 4.

Ink Discharging Process (Image Forming Process)

In an environment at 22.5-23.5 degrees C. and 45 to 55 percent RH, an inkjet recording device (IPSiO GXe-5500, manufactured by RICOH CO., LTD.) was set to change the drive voltage of the piezo element to discharge the same amount of ink so that the same amount of the ink was attached to a recording medium (OK TOP COAT+, weight: 104.7 g/m$^2$, manufactured by OJI PAPER CO., LTD.).

Image Density

A chart having general symbols of 64 point JIS X 0208 (1997), 2223 created by Microsoft Word 2000 was printed on MyPaper (manufactured by Ricoh Company Ltd.) by using each ink and thereafter the colors of the symbols were measured by a spectrodensitometer (X-Rite 39, manufactured by X-Rite) to evaluate the image density of each color according to the following criteria. The print mode used: A modified mode in which "Plain Paper—Standard Fast" was modified to "No Color Calibration" by the driver installed onto the printer.

Incidentally, the symbols of JIS X 0208 (1997), 2223 have square exterior with inside entirely painted by ink.

Evaluation Criteria
A: Black: 1.25 or greater
Yellow: 0.80 or greater
Magenta: 1.00 or greater
Cyan: 1.05 or greater
B: Black: 1.20 to less than 1.25
Yellow: 0.75 to less than 0.80
Magenta: 0.95 to less than 1.00
Cyan: 1.00 to less than 1.05
C: Black: 1.15 to less than 1.20
Yellow: 0.70 to less than 0.75
Magenta: 0.90 to less than 0.95
Cyan: 0.95 to less than 1.00
D: Black: less than 1.15
Yellow: less than 0.70
Magenta: less than 0.90
Cyan: less than 0.95

Beading

The recording medium was changed to OK TOP COAT+ (weight: 104.7 g/m$^2$, manufactured by OJI PAPER CO., LTD.) and the print mode used was modified from "gloss paper—aesthetic" to "No Color Calibration" by the driver installed onto the printer. Solid images were printed in the same manner as in the image density to visually check density uniformity (beading) of the solid image and evaluate beading according to the following criteria. Since the black solid image was very difficult to see as was, it was observed by an optical microscope with a magnifying power of 40 times.

Evaluation Criteria
A: Not at all
B: Slightly observed
C: Fairly observed
D: Significantly observed Drying Property The chart having the same general symbols as in the case of the image density was printed by the image forming apparatus illustrated in FIG. 1 on OK TOP COAT+ (weight: 104.7 g/m$^2$, manufactured by OJI PAPER CO., LTD.). The symbols were dried by heated wind of 100 degrees C. for 10 seconds in the drying process. Thereafter, whether the ink of the image portion was attached to the transfer roll was visually checked on the dried image portion and evaluated according to the following criteria.

Evaluation Criteria
A: No transfer at all
B: Slight transfer observed causing no practical problem
C: Transfer observed
D: Significant transfer observed Discharging Stability 1: Intermittent Discharging Evaluation A chart of solid images created by Microsoft Word 2000 taking 5 percent area of paper having a size of A4 was continuously printed on MyPaper (manufactured by Ricoh Company Ltd.) with a run length of 200 sheets and disturbance of ink discharging by each nozzle after the printing was evaluated according to the following criteria. The print mode used: A modified mode in which "Plain Paper—Standard Fast" was modified to "No Color Calibration" from the user setting for plain paper in the user setting of plain paper by the driver installed onto the printer.

Evaluation Criteria
A: No discharging disturbance
B: Slight discharging disturbance observed
C: Discharging disturbance observed or no discharging observed
D: Significant discharging disturbance observed or many nozzles not discharging Discharging Stability 2: Nozzle Plate Ink Repelling Time In an environment at 22.5-23.5 degrees C. and 45 to 55 percent RH, 50 g of each ink was charged into a 50 mL beaker. The same head nozzle plate as used that in an inkjet recording device (IPSiO GXe-5500, manufactured by RICOH CO., LTD.) was nipped by tweezers and dipped into the ink at a rate of 315 mm/minute and taken out therefrom at the same rate to measure the ink repelling time from the ink repelling layer followed by evaluation according to the following criteria.

If the nozzle plate ink repelling time is long, the ink is easily wet on the nozzle plate so that the ink tends to be non-discharged in the continuous discharging evaluation.

Evaluation Criteria
A: Ink repelling time less than 10 seconds
B: Ink repelling time 10-less than 30 seconds
C: Ink repelling time 30-less than 60 seconds
D: Ink repelling time 60+ seconds

TABLE 4

| | Image Density | Beading | Evaluation on Drying Property Image portion transfer | Discharging stability 1 Intermittent discharging evaluation | Discharging stability 2 Ink repelling time |
|---|---|---|---|---|---|
| Example 1 | B | B | B | A | A |
| Example 2 | A | B | B | A | A |
| Example 3 | B | B | A | A | A |
| Example 4 | A | A | A | A | A |
| Example 5 | A | A | A | B | A |
| Example 6 | A | A | A | A | A |
| Example 7 | A | A | B | A | A |
| Example 8 | A | A | A | A | B |
| Example 9 | A | A | B | A | A |
| Example 10 | A | A | A | A | A |
| Example 11 | A | A | A | A | A |
| Example 12 | A | A | A | A | A |
| Example 13 | A | A | A | B | A |
| Example 14 | A | A | A | A | A |
| Example 15 | A | A | A | A | A |
| Example 16 | A | A | A | A | A |
| Example 17 | A | B | A | B | A |
| Example 18 | A | A | A | A | B |
| Comparative Example 1 | A | A | C | A | A |
| Comparative Example 2 | B | D | D | A | A |
| Comparative Example 3 | A | A | C | B | A |
| Comparative Example 4 | A | A | A | D | A |
| Comparative Example 5 | A | A | C | A | A |

As seen in the results shown in Table 4, the ink of Examples 1 to 8 are excellent with regard to beading and drying property for commercial printing paper and image density and discharging stability are also good.

On the other hand, since the ink of Comparative Examples 1 to 5 does not satisfy at least one of the requisite No. 1-3, the ink has problems with regard to at least one of beading, drying property, and discharging stability.

Comparative Example 1

Example including no compound z of the requisite No. 2

Comparative Example 2

Example including no organic solvent X of the requisite No. 1 or no compound z of the requisite No. 2 but another organic solvent Comparative Example 3

Example including a glycolether compound other than the compound Z of the requisite No. 2

Comparative Example 4

Example including the compound Z more than the organic solvent X, which does not satisfy the requisite No. 3

Comparative Example 5

Example including the organic solvent X excessively, which does not satisfy the requisite No. 3

According to the present invention, ink is provided which has good drying property and productivity for commercial printing paper in addition to plain paper while recording quality images thereon with good image density and discharging stability while suppressing beading.

Having now fully described embodiments of the present invention, it will be apparent to one of ordinary skill in the art that many changes and modifications can be made thereto without departing from the spirit and scope of embodiments of the invention as set forth herein.

What is claimed is:
1. An ink, comprising:
a coloring material;
an organic solvent; and
water,
wherein the ink satisfies the following requisites I to III:
  I. the organic solvent includes an organic solvent X having a solubility parameter (SP value) of 8.9-12.0,

II. the organic solvent includes glycol ether compound having a vapor pressure of 50 mmHg or greater at 100 degrees C.; and III. a mass ratio of the organic solvent X to the glycol ether compound is 1:1-8:1.

2. The ink according to claim 1, wherein the glycol ether compound comprises at least one selected from the group consisting of propyleneglycol monopropylether, propyleneglycol monomethylether, propyleneglycol monoethylether, propylene glycol monobutylether, 3-methoxy-1-butanol, and 3-methoxy-3-methyl-1-butanol.

3. The ink according to claim 1, wherein the organic solvent X accounts for 20 percent by mass of a total mass of the ink.

4. The ink according to claim 1, wherein the organic solvent X is represented by the following Chemical formula 1 or Chemical formula 2:

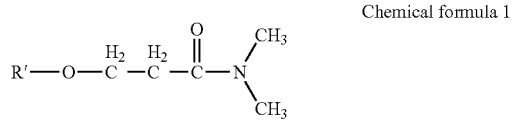

Chemical formula 1 wherein R' represents an alkyl group having 4-6 carbon atoms, and

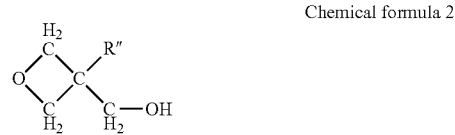

Chemical formula 2 wherein R" represents an alkyl group having one or two carbon atoms.

5. The ink according to claim 1, further comprising a surfactant comprising a polyether-modified siloxane compound.

6. The ink according to claim 1, wherein the ink has a static surface tension of 20 mN/m or greater and a dynamic surface tension of 34 mN/m or less at a bubble life time of 15 msec as measured by maximum bubble pressure technique.

7. The ink according to claim 1, wherein the coloring material comprises a pigment.

8. An image forming method, comprising:
applying at least one kind of stimulus selected from the group consisting of heat, pressure, vibration, and light to the ink of claim 1 to jet the ink of claim 1; and
forming an image on a recording medium with the ink of claim 1.

9. An image forming apparatus, comprising:
the ink of claim 1; and
an ink discharging device configured to apply at least one kind of stimulus selected from the group consisting of heat, pressure, vibration, and light to the ink of claim 1 to jet the ink of claim 1 to a recording medium to form an image thereon.

10. A recorded matter, comprising:
a recording medium; and
an image formed on the recording medium with the ink of claim 1.

11. The ink according to claim 1, wherein
the organic solvent X comprises at least one selected from the group consisting of 3-n-buthoxy-N,N-dimethyl propaneamide, 3-ethyl-3-hydroxymethyl oxetane and 3-methyl-3-hydroxymethyl oxetane, and
the glycol ether compound comprises at least one selected from the group consisting of propylene glycol monopropylether, propylene glycol monomethylether, propylene glycol monoethylether, propylene glycol monobutylether, 3-methoy-1-butanol and 3-methoy-3-methyl-1-butanol.

* * * * *